July 21, 1964

TOHRU MOTOOKA 3,141,959

COUNTING APPARATUS

Filed July 8, 1960

July 21, 1964  TOHRU MOTOOKA  3,141,959
COUNTING APPARATUS
Filed July 8, 1960  4 Sheets-Sheet 3
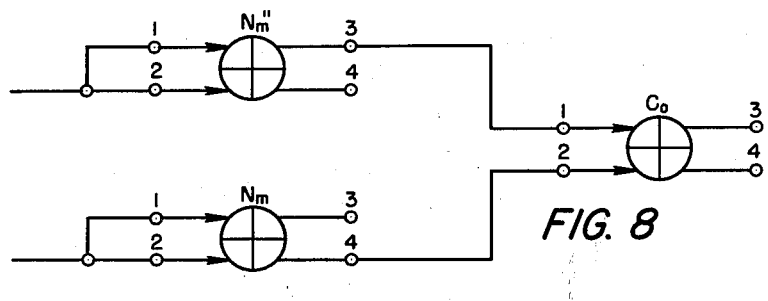
FIG. 8
FIG. 10
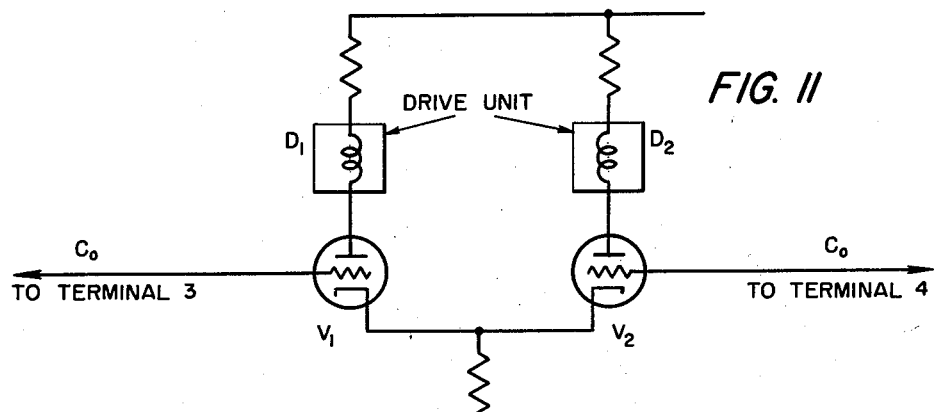
FIG. 11
FIG. 12
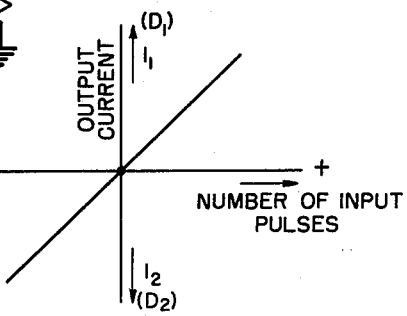

July 21, 1964

TOHRU MOTOOKA
COUNTING APPARATUS 3,141,959

Filed July 8, 1960

INVENTOR
TOHRU MOTOOKA

BY *Robert E. Burns*

ATTORNEY

3,141,959
COUNTING APPARATUS
Tohru Motooka, 410 1-chome Tozuka, Shinjuku-ku,
Tokyo, Japan
Filed July 8, 1960, Ser. No. 41,659
2 Claims. (Cl. 235—92)

The present invention relates to electronic counting devices and more particularly to a counting device combining advantages of both the digital and analogue types of counters.

Counters generally fall into one of two classes, either the digital class or the analogue class. The classes differ in operation in that the digital counter performs a counting operation of a number of units that represent a number, for example, of pulses; whereas the analogue counter performs a measuring operation of some quantity that represents a number, for example, voltage or time. Both counters are accurate within their respective designed limits but the digital counter gives in effect approximations of answers. However the analogue counter is lighter, simpler, and less expensive than the digital counter.

It is an object of the invention to provide a counter combining the advantage of the accuracy of the digital counter with those of lightness and simplicity of the analogue counter.

Another object of the invention is to provide a counter that receives the numbers to be counted digitally and gives the results analogously.

Features of the invention are the addition and subtraction to negative pulses of electrical energy of a preselected frequency, of similar pulses representing in number and operating sign, i.e. the numbers, plus or minus, to be counted. All number pulses are negative pulses and have the operating signs of either plus or minus. The negative pulses which have plus operating signs are subtracted from the preselected frequency pulses and the negative pulses which have minus operating signs are added to the preselected frequency and thus a resultant frequency is obtained. The resultant frequency and the preselected frequency are divided by the same number of frequency divider stages and the phase difference between the equally divided frequencies is compared with the phase lead or lag of the resultant frequency giving an analogue value of the algebraic sum of the numbers counted.

Other objects and a more complete understanding of the invention may be had by referring to the following description and claims taken in conjunction with the accompanying drawings in which:

FIG. 1 is a block diagram illustrating the main components and the arrangement thereof of the invention, FIG. 2 is a block diagram illustrating the subcomponents of the initial block in FIG. 1, FIG. 3 is a schematic diagram of the electronic circuit of an "or" gate, FIG. 4 is a schematic diagram of an "and" gate, FIG. 5 is a schematic diagram of a monostable multivibrator, FIG. 6 is a schematic diagram of a basic binary circuit commonly known as a flip-flop circuit.

FIG. 8 is a block diagram of the final stage of the frequency divider stages and comparison circuit.

FIG. 10 is a diagrammatic sketch of the wave forms at terminals 1, 2, 3 and 4 of FIG. 8, FIG. 11 is a schematic diagram of the control circuit of a servo valve, FIG. 12 is a graph of output currents against input pulses.

Figure 1:
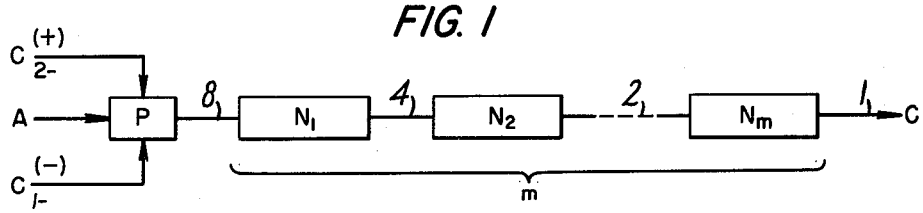

Referring to FIG. 1, the invention comprises an input side P which increases or decreases a preselected frequency of negative pulses of electrical energy represented by the letter A in accordance with the number and operating sign, plus or minus, of similar pulses to be counted and designated by the letters. Input pulses A and C are synchronously clocked by pulse synchronizing circuit means (well known and not shown) to enter the input side P out of coincidence. The output of the block P is applied to the cascaded frequency divider stages $m$. The phases of the signal A and the combined signals A and C at the output side of the frequency dividers are compared, the measure of any difference in phase lead or lag being the analogue sum or difference of the numbers represented by the pulses $C_2-$ and $C_1-$.

Figure 2:
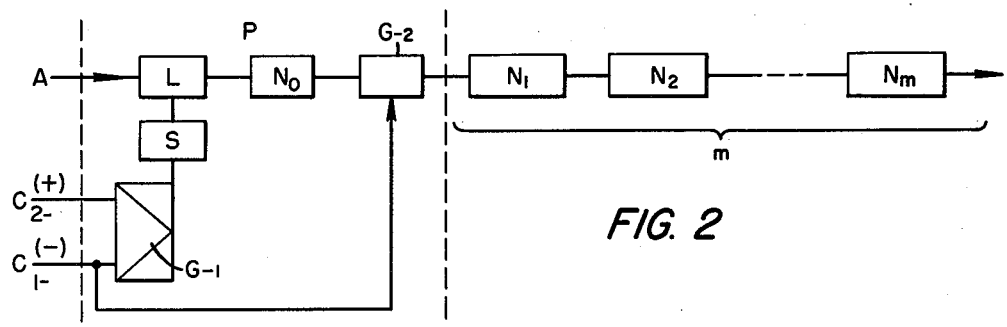
Figure 3:
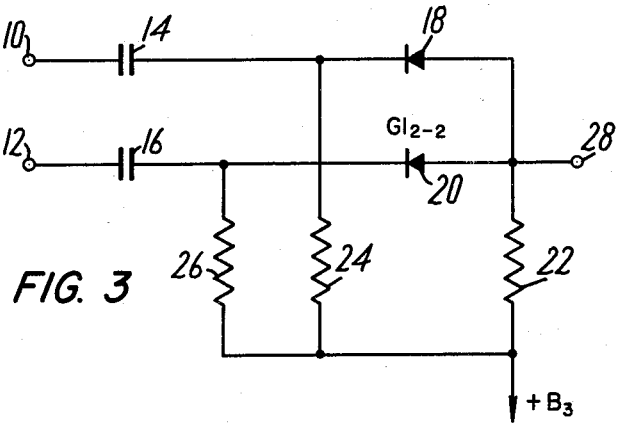
Figure 4:
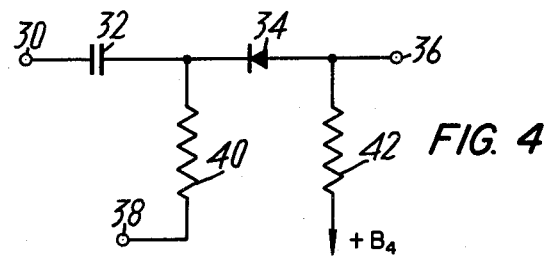
Figure 5:
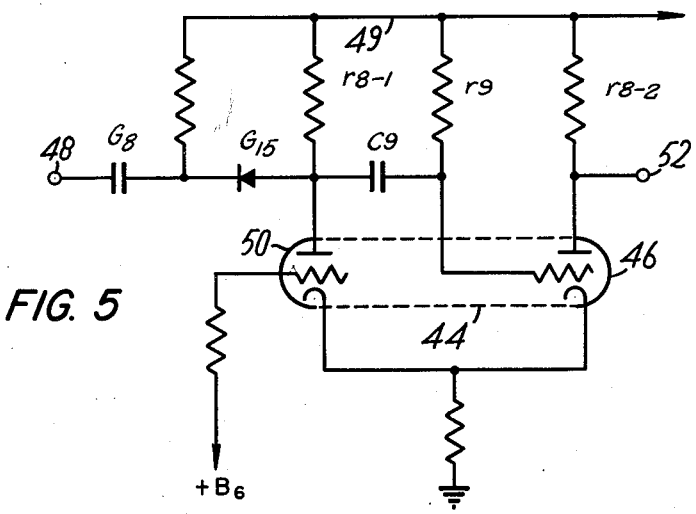
Figure 6:
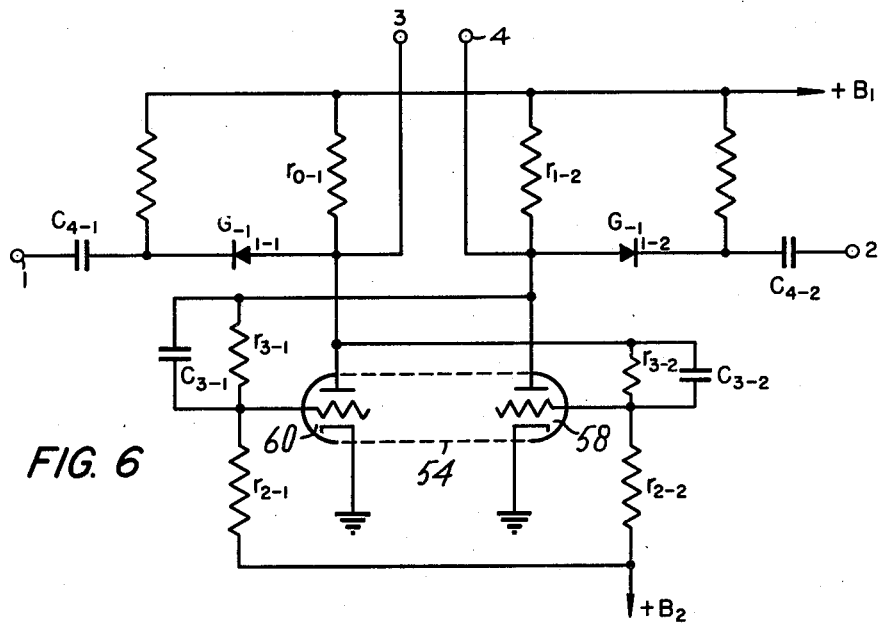

FIG. 2 illustrates the components and arrangement of the block P. The block G-1 is an "or" gate, an example of which is illustrated in FIG. 3 that is biased to provide a negative pulse output whenever a $C_1-$ or $C_2-$ pulse is impressed on the gate. The block S is a monostable multi-vibrator circuit, an example of which is illustrated in FIG. 5 that is responsive to the output of block G-1 to cut off a normally conducting tube of the multivibrator thereby raising output potential of this tube. The block L represents an "and" gate, an example of which is illustrated in FIG. 4, which is biased to conduct the signal A by the normally conducting tube output of block S. However when the tube cuts off and develops a high output potential, the "and" gate L is biased to nonconduction. Thus the output of block L comprises the signal A decreased by a pulse for every $C_1-$ and $C_2-$ pulse impressed on block G. The block No is a frequency divider that reduces the frequency of the output of block L by one half and is a basic binary circuit generally known as a flip-flop circuit, an example of which is illustrated in FIG. 6. The block G-2 is another "or" gate through which a pulse is added to the output of block No for every $C_1-$ pulse (see FIG. 2). It should be noted that adding a pulse after the frequency divider, No is equivalent to adding two pulses before the frequency divider, thus the net effect of the components of P is to increase the frequency of signal A by one pulse for every $C_1-$ pulse and to decrease the frequency of signal A one pulse for every $C_2-$ pulse. Each of the blocks N is a frequency divider that halves the frequency of the output of the preceding component. The frequency dividers are cascaded in $m$ stages to reduce the frequency of signal A into a desired lower frequency. Signal A and combined signal A and $C_1-$ and $C_2-$ are similarly frequency divided by their respective networks which each includes the same numbers of frequency divider stages. The phase of frequency divided output signal of combined signal A and $C_1-$ and $C_2-$ is led or lagged in relation to signal A according to the number and the operating sign of input pulses of signals $C_1-$ and $C_2-$. The frequency divided combined signal A and C and the frequency divided reference signal A are compared to each other and their difference is transmitted as an analogue output signal which includes the algebraic sum of numbers indicated by input signals $C_1-$ and $C_2-$.

Referring to FIG. 3 the "or" gate circuit of blocks G-1 and G-2 each comprises input terminals 10 and 12 connected in series respectively to capacitors 14 and 16 and to the cathode of rectifiers 18 and 20, the anodes of which are interconnected and positively biased by a $+B_3$ power supply across a resistor 22. Resistors 24 and 26 are connected across the B-plus power supply and each of the series rectifier circuits between capacitor 14 and rectifier 18, and the capacitor 16 and the rectifier 20 respectively. Output terminal 28 is intermediate the power supply resistor 22 and the connected anodes of the rectifiers 18 and 20. When either of the terminals 10 or 12 is provided with a negative pulse, a negative pulse is produced at terminal 28.

An "and" gate circuit is illustrated in FIG. 4 and comprises terminal 30 connected in series to capacitor 32, the cathode of rectifier 34 the anode of which is in series with the output terminal 36, a second input terminal 38 is connected across resistor 40 between capacitor 32 and rectifier 34. $+B_4$ power supply is coupled by resistor 42 to the anode of rectifier 34. When negative pulses A are applied to terminals 30 and a low potenital (equal to $+B_4$) is applied to terminal 38 the "and" gate passes the A pulses to the output terminal 36. A high potential at terminal 38 blocks passage of the negative pulses to terminal 36.

FIG. 5 illustrates a monostable multivibrator circuit comprising a dual triode tube 44 one side 46 of which is biased to normally conduct. The plate output of the normally conducting side 46 is at a low potential, but if a negative pulse is applied to input terminal 48 through the resistor capacitor network 49 the nonconducting side 50 conducts and cuts off the normally conducting side 46, thereby raising the potential to terminal 52 to maximum plate voltage. More specifically when no input pulse is applied to the terminal 48, the plate and grid of the side 46 of the dual triode tube 44 are connected with $+B_5$ power source respectively via the resistances $r_{8-2}$ and $r_9$, thus keeping the side 46 in operation. Under this condition the output terminal 52 is at a low potential. If a negative pulse is given to the terminal 48, it will be impressed on the plate and grid of the side 46 by way of the condenser $C_8$, rectifier $G1_5$ and the condenser $C_9$, thus cutting off the side 46. A $+B_6$ power source voltage is impressed on the grid of the side 50 of the dual triode tube 44 by way of the resistance $r_{10}$ is so fixed that while the side 46 is in operation the side 50 is in a cut-off condition, and vice versa. To put it more particularly, the output terminal 52 is at a high potential while the side 46 is cut off. Simultaneously the cathode potential of the side 50 falls at the rate determined by the resistance $r_{11}$ and causes a relative decrease in its grid potential, thus setting the side 50 conducting. At this moment the plate potential of the side 50 falls at the rate determined by the resistance $r_{8-1}$, and in turn causes a drop in the grid potential of the side 46. The potential of the side 46 is raised to $+B_5$ power source voltage after a certain interval determined by the condenser $C_9$ and the resistance $r_9$, whereupon the side 46 starts functioning and the side 50 is cut off. Concurrently the voltage at output terminal 52 falls to a low potential. In this way the terminal 52 is raised to a high potential during a certain period determined by the condenser $C_9$ and the resistance $r_9$, every time the terminal 48 is supplied with a negative pulse. The output thus obtained at the terminal 52 is fed to the terminal 38 of the "and" gate circuit, FIG. 4, as an input signal thereby decreasing the frequency of A pulses by the above mentioned number pulses, i.e. $C_1-$ and $C_2-$ signals.

FIG. 6 illustrates the frequency divider stage N$o$ and the $m$ stages $N_1$ . . . N$m$ and each of which is a basic binary circuit known as a flip-flop and comprising a duo triode 54 connected as shown. Negative pulses supplied to terminal 1 affects only the grid of the conducting triode 58 to cut it off thereby biasing the outer triode 60 to start conducting. A second negative pulse is required to cause the circuit to complete the multivibrator cycle and start the first triode 58 to reconduct to cut off the second triode 60. The circuit operates specifically as follows:

The plates of both triodes 58 and 60 are connected with the $+B_1$ power source respectively through medium of the resistances $r_{0-1}$ and $r_{1-2}$, and their grids are connected with the $+B_2$ power source respectively through the resistances $r_{2-1}$ and $r_{2-2}$. The plate of triode 60 is connected with the grid of triode 58 via the resistance $r_{3-2}$ and the condenser $C_{3-2}$, while the plate of triode 58 is connected with the grid of triode 60 via the resistance $r_{3-1}$ and the condenser $C_{3-1}$. In this circuit construction the plate potential of triode 58 (or 60) falls when the said triode is in operation and in turn decreases the grid potential of the other triode 60 (or 58), thus keeping the latter inactive. Consequently the output terminals 3 and 4 are respectively at a low and high potentials. Now triode 58 is supposed to be "on" and if a negative pulse is applied to only terminal 1 or to both terminals 1 and 2 simultaneously the negative pulse applied to terminal 1 will reach to the grid of triode 58 through condenser $C_{4-1}$, rectifier $G-1_{1-1}$, condenser $C_{3-2}$ and resistance $r_{3-2}$ and cut off the triode. At this moment the plate of triode 58 will become high potential (cut off potential) and its electric potential appears on terminal 4 and, at the same time, the potential will be delivered to the grid of the other triode 60 through condenser $C_{3-1}$ and resistance $r_{3-1}$ and the triode 60 will be made conducting. At this moment, the plate of triode 60 becomes low potential (saturation potential) and the potential will appear on terminal 3 and, at the same time, the latter potential is delivered to the grid of triode 58 which will be maintained in cut off condition. Then if a negative pulse is applied to only terminal 2 or to both terminals 1 and 2 the triode 60 will be cut off and the other triode 58 will be made conducting and the potentials of terminals 3 and 4 will reverse.

The flip-flop circuit shown in FIG. 6 is used as the binary circuits N$o$ and $N_1-Nm$ shown in FIG. 1 and 2 and also used as the comparison circuit mentioned later (see C$o$ in FIG. 8). When using as a binary circuit it shall be connected so that the input pulse (negative pulse) is applied to both terminals 1 and 2 simultaneously. Thus, if the negative pulses are supplied to terminals 1 and 2 with an appropriate interval, the potentials appearing on terminals 3 and 4 become reverse by each arrival of negative pulse. Therefore, negative output pulses having ½ frequency of input pulses given to terminals 1 and 2 from terminal 3 or 4 will be obtained and the flip-flop circuit will work as binary circuit. On the other hand when using the latter flip-flop circuit as a comparison circuit two input pulses to be compared shall be supplied to terminals 1 and 2. In this case either high or low potential will appear on terminal 1 or 2 depending on which terminal (1 or 2) the negative pulse is applied. Detail explanation of operation as a comparison circuit is made later in the disclosure relative to FIG. 8.

The operational components described above are arranged as shown in the block diagrams FIGURES 1 and 2. The circuit elements are interconnected as follows: The "or" gate G–1 illustrated in FIG. 3 is connected to receive the $C_2-$ and $C_1-$ signals on terminals 10 and 12 respectively and pass either as a negative output from terminal 28 to terminal 48 of the monostable multivibrator designated S in FIG. 2 and illustrated in FIG. 5 to cut off the normally conducting side to raise the plate voltage and therefore the potential at terminal 52 to a maximum. The output from the terminal 52 of the multivibrator S which is either a low potential when the normally conducting side is not cut off or a high potential when it is cut off, is applied to the terminal 38 of the "and" gate L, FIG. 4. Input terminal 30 of this "and" gate L receives the negative A signal of preselected freqeuncy and passes it when the applied potential at terminal 38 is low and interrupts it when the potential is high. The output of the "and" gate from terminal 36 is thus the frequency of A less the applied pulses $C_2-$ and $C_1-$, and this frequency difference is supplied to input terminals 1 and 2 of the basic binary circuit illustrated in FIG. 6 and designated N$-o$ in FIG. 2. This is a flip-flop circuit in which half of a dual triode conducts until a negative pulse shifts the other half to conducting. When a series of negative pulses of a selected frequency is applied to input terminals 1 and 2 the output from terminal 4 is half the applied frequency of the input at terminals 1 and 2. The negative output of divided frequency from terminal 4 is impressed on another "or" gate circuit designated by block G–2 at a terminal corresponding to terminal 10 of FIG. 3 and receives the $C_1$— pulses as a terminal corresponding to the terminal 12 as illustrated in FIG. 3, and passes them with the output pulses from the frequency divider N—o. The output from the terminal corresponding to terminal 28 of FIG. 3 comprising the pulses from N—o and the $C_1$— pulses is supplied to the cascaded frequency divider circuits or stages similar to the circuit of block N—o and N comprising $m$ stages. It should be noted that these pulses being of like sign and passed by the "or" gate, the output is the sum of the N—o and $C_1$— pulses.

Figure 7:
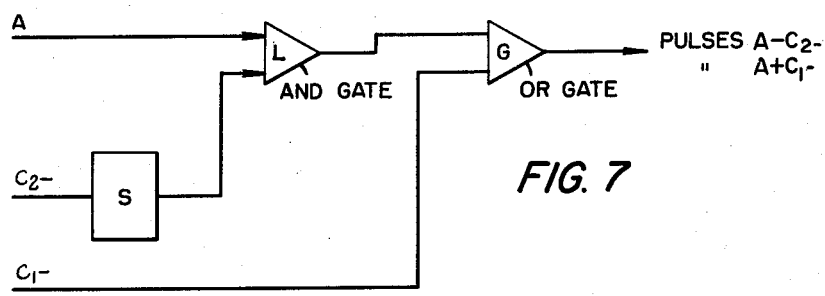
FIG. 7 is a block diagram of another embodiment of the invention.

FIG. 7 illustrates another embodiment of the invention that is simpler in arrangement and number of components and introduces no new components. The A signal is applied to terminal 30 of an "and" gate illustrated in FIG. 4 and designated L in block diagram of FIG. 7. The $C_2$— signal is applied to terminal 48 of the monostable multivibrator of FIG. 5 and designated by block S, the output of which is applied from terminal 52 to the input terminal 38 of the "and" gate L to reduce the frequency of the negative A by the number of applied $C_2$— pulses as heretofore explained with respect to FIG. 2. The negative output of the frequency difference at the "and" gate L terminal 36 is applied to terminal 10 of the "or" gate G. The $C_1$— pulse or pulses are applied to the terminal 12 of the "or" gate G. The negative output from the terminal 28 of the G gate is the sum of the negative frequencies applied and this sum then applied to the $m$-stages of the frequency dividers N as described heretofore for the first embodiment of the invention.

The operating principle of the network of FIG. 7 is as follows: Signal A is continuously applied to the "and" gate L. $C_2$— pulses are impressed across the multivibrator S which thereby cuts off the passage of signal A through "and" gate L to give a frequency output to the "or" gate of signal A freqeuncy less signal $C_2$— pulses. $C_1$— pulses are supplied to terminal 12 of the "or" gate G and the output terminal of gate G supplies a signal which has a frequency of signal A pulses minus signal $C_2$— pulses plus signal $C_1$— pulses. The output signal from terminal 28 of the "or" gate G is then connected to the frequency divider stages as shown in FIG. 2. The comparison between combined signal A and C and reference signal A is made as follows: The reference signal A and combined signal A and C ($C_1$— and $C_2$—) are frequency divided according to respectively similar frequency divider networks. As shown in FIG. 2 both networks includes a single frequency divider circuit No and cascaded frequency divided circuits $N_1$–$Nm$ of same number of stages, and all these divider circuits, as mentioned earlier, consist of flip-flop circuits as shown in FIG. 6. The input side P of network for signal A only includes frequency divider circuit No, and the other components shown in FIG. 2 are omitted. The frequency divided combined signal A and C and frequency divided reference signal A are applied to the comparison circuit indicated in FIG. 8 and are converted to an analogue output signal of rectangle wave form the time length of which is changed according to the number and sign of input signal. FIG. 8 indicates the block diagram of final stage of the above mentioned two frequency divider networks. In FIG. 8, $Nm$ is a final stage of the frequency divider network for signal A, namely, it corresponds to a frequency divider circuit $Nm$ of the final stage of the frequency divider stages $m$ in FIGS. 1 and 2, and $N''m$ is the frequency divider circuit of final stage of frequency divider network for the combined signal A and C, and, as mentioned earlier, both of circuits $Nm$ and $N''m$ consist of a flip-flop circuit as illustrated in FIG. 6. Furthermore, $Nm$ and $N''m$ in FIG. 8 are shown in more detailed block than they are in FIGS. 1 and 2. Co is a comparison circuit consisting of flip-flop circuit shown in FIG. 6 and the same as $Nm$ and $N''m$. The frequency divided reference signal A designated by letter A and frequency divided combined signal A and C designated by letter A'' are picked up respectively from terminal 4 of circuit $Nm$ and terminal 3 of circuit $N''m$ and are supplied to circuit Co.

Figure 9:
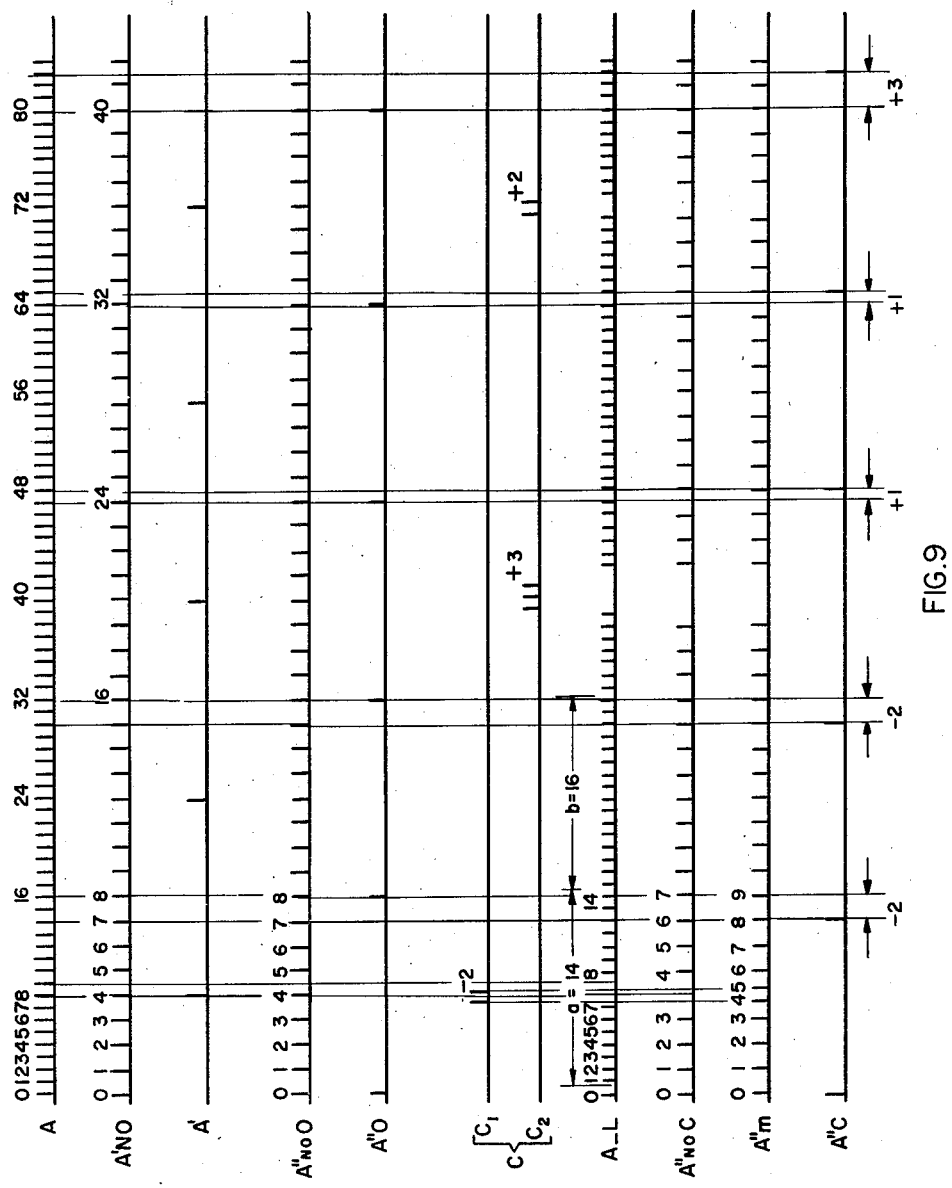
FIG. 9 is a diagrammatic sketch illustrating the pulse frequencies at various components.

Referring to the pulse frequencies in various components shown in FIG. 9 the scale A indicates the reference signal A having preselected frequency as aforementioned. For convenience of explanation, the frequency of signal A is assumed to be 16 c./s. and the aforementioned frequency divider network for signal A is assumed to include a single frequency divider circuit No and frequency divider circuits $N_1$–$N_3$ of three stages as shown in FIG. 2. Furthermore, in this figure the circuit $N_3$ corresponds to circuit $Nm$ of FIG. 8. Scale A'No indicates the output signal of the above-mentioned No and has a frequency of ½ of signal A, namely 8 c./s. Scale A' indicates the output signal of the frequency divider circuit $N_3$ of final stage, i.e. signal A', and this signal A' has a frequency of 1 c./s. The frequency divider network for the combined signal A and C has a single No, and $N_1$–$N_3$ of three stages as same. Scale A''NoO indicates the output signal of circuit No in the frequency divider network for the combined signal when input signal C is zero and its frequency is 8 c./s. as in scale A'No. Scale A''O is the output signal A'' of final stage $N_3$ of the same network. Furthermore, the latter $N_3$ corresponds to $N''m$ in FIG. 8. Output signal A''O has a frequency of 1 c./s., the same as standard output signal A' and it is the reverse in time against A', namely, a single pulse of A''No is made to appear at the exactly intermediate position of continuous two pulses of A'. Scales C indicate input signals C showing the numbers to be counted, and includes the $C_1$— pulses indicating minus numbers, and the $C_2$— pulses indicating plus numbers. Scale A–L is an output signal of block L in network for the combined signal A and C (refer to FIG. 2). As shown in FIG. 9, when the input signal C is given, the same numbers of pulse or pulses as that of signal C given from A–L are deducted regardless of whether they are $C_1$— or $C_2$— pulses. For instance, in the range of (a) in FIG. 9, —2 will be given as signal $C_1$— and as a result two pulses will be deducted at A–L and frequency of A–L is converted to 14 c./s. If the signal $Ci$ is zero in the next range (b) of FIG. 9, the frequency becomes 16 c./s. again. Scales A''NoC, A''m and A''C are respectively output signals of block No, $G_2$ and $N_3$ of the network for the combined signal A and C when the input signal C is given as shown in scale C. In signal A''m, when input signal C for a minus number, namely, $C_1$—, is given and when a single $C_1$— pulse is applied, a single pulse is added to signal A–L. The output signal A''C will appear from output signal A''O when input signal C is zero with a phase differential as shown in scale A''C. In other words, if —2 is given as $C_1$— pulses in range of (a), the pulses of A''C will lead from A''O by two pulses of reference signal A and in the next range of (b) if the signal C is zero the latter phase differential will be maintained as is, and, then, if +3 is given as $C_2$— pulses the A''C signal will then lag the A''O signal by a single pulse of A. Signal A' and signal A'' (namely, A''O and A''C) are respectively supplied to terminals 1 and 2 of comparison circuit Co as mentioned for FIG. 8. Now suppose the circuit Co is in the condition that high potential is sent to terminal 3 and low potential is sent to terminal 4 and, at this moment, if signal A' is given to terminal 1, the triode 58 shown in FIG. 6 will be cut off and the triode 60 will be conducted. Thus the saturation potential (low potential) will appear on terminal 3 and cut off potential (high potential) will appear on terminal 4. Then if signal A'' is applied to terminal 2 successively the triode 60 will be cut off and triode 58 will conduct and the potentials of terminals 3 and 4 will be reserved. The relations between signals A′ and A″ and potentials appearing on terminals 3 and 4 can be shown as FIG. 10. As mentioned for FIG. 9, signal A′ is always applied to terminal 1 with a constant time interval T. However, signal A″ is applied to terminal 2 with a phase differential of T/2 from A′ by the same time interval T when input signal C is zero (see scale A″O in FIG. 9). On the other hand, if the input signal C is not zero, A″ will be led or lagged from the above time according to the number and sign represented by given input signal C (see scale A″C in FIG. 9). Thus the rectangle form wave voltage, the potential of which is converted as shown in FIG. 10, appears on terminals 3 and 4 by each supply of signals A′ and A″. And the ratio of time $T_2$ and $T_1$ at which the high potential appears on terminals 3 and 4 will be changed according to the lead or lag of phase of A″, namely, the number and sign of the number represented by input signal C. The potentials appeared on terminals 3 and 4, are for instance, used as input signal for control of servo motor as shown in FIG. 11. Namely the terminals 3 and 4 of circuit Co are respectively connected to the grids of switching elements $V_1$ and $V_2$ as shown in FIG. 11 and through the latter $V_1$ becomes "on."

Through that $V_1$ comes "on" and $V_2$ comes "off," or $V_2$ comes "on" and $V_1$ comes "off," so that a constant current flows in the driving unit $D_1$ or $D_2$, for instance in the coil of a servo-valve of a well known type such as manufactured by the Moog Valve Co., Inc., Proner Airport, East Aurora, New York, and designated a "low flow control servo-valve Series 21." Suppose the flowing current is $Im$ and the time when the terminal 3 is at high potential, is $T_1$ and the time when the terminal is at high potential, is $T_2$, then the average current $I_1$ (or $I_2$) which flows in $D_1$ (or $D_2$) is formularized as follows:

$$I_1 = I_m \times \frac{T_1}{T}(T = T_1 + T_2)$$

$$\left(I_2 = I_m \times \frac{T_2}{T}\right)$$

Referring to FIG. 12, if $T_1$ is equal to $T_2$, then the state $I_1 = I_2$ comes about, so that the same currents flow in the average into $D_1$ and $D_2$. If $D_1$ and $D_2$ operate differentially, then the input of the driving unit becomes equal to zero.

On the other hand, if the state $T_1 > T_2$ (or $T_1 < T_2$) comes about, then the stated $I_1 > I_2$ ($I_1 < I_2$) comes about. This relation is corresponding to the number of the input pulses, the driving unit is driven by the side $D_1$ or $D_2$.

The invention has been described by way of example and it is understood that numerous changes in details of construction or arrangements of parts may be resorted to without departing from the spirit and scope of the invention as hereinafter claimed.

What I claim and desire to secure by Letters Patent is:

1. An improved electronic counting device having a source of negative pulsating electrical energy with a preselected reference pulse frequency for adding and subtracting digital inputs representative of positive and negative numbers according to their operating signs and indicating the resultant total in an analogue output, said counting device comprising: an input side comprising a first "or" gate, a monostable multi-vibrator, an "and" gate, a flip-flop frequency divider circuit and a second "or" gate connected in series in the stated order, circuit means for supplying from said source of negative pulsating electrical energy said reference pulse frequency continuous to said "and" gate; circuit means supplying from said source reference pulse frequency a number of respective negative pulses representative of respective numbers and their operating signs to be algebraically added, said pulses being representative of numbers having minus operating signs and plus operating signs, means for applying said negative pulses for both negative and positive numbers respectively comprising leads for applying to said first "or" gate through separate leads and said pulses representing negative numbers to said second "or" gate to decrease said continuous reference frequency for every negative pulse corresponding to a positive number pulse and increase said reference frequency for every pulse representative of a negative number, and an output side comprising flip-flop circuit frequency divider means comprising a plurality of frequency divider stages for modulating the preselected reference pulse frequency by half in each of said cascaded plurality of frequency divider stages and for similarly modulating the frequency of the combined number pulses and said reference frequency pulses in the same number of frequency divider stages; means for comparing and measuring the difference in phase lag and lead between said frequency divided reference pulses and combined reference and number pulses, and said difference being the algebraic sum of said positive and negative numbers.

2. An improved electronic counting device having a source of negative pulsating electrical energy with a preselected reference pulse frequency for adding and subtracting digital inputs representative of positive and negative numbers according to their operating signs and indicating the resultant total in an analogue output, said counting device comprising: an input side comprising a first "or" gate, a monostable multi-vibrator, an "and" gate, a flip-flop frequency divider circuit and a second "or" gate connected in series in the stated order, circuit means for supplying from said source of negative pulsating electrical energy said reference pulse frequency continuuously to said "and" gate; circuit means supplying from said source reference pulse frequency a number of respective negative pulses representative of respective numbers and their operating signs to be algebraically added, said pulses being representative of numbers having minus operating signs and plus operating signs, means for applying said negative pulses for both negative and positive numbers respectively comprising leads for applying to said first "or" gate through separate leads and said pulses representing negative numbers to said second "or" gate, to decrease said continuous reference frequency for every negative pulse correspoding to a positive number pulse and increase said reference frequency for every pulse representative of a negative number, and an output side comprising flip-flop circuit frequency divider means comprising a plurality of frequency divider stages for modulating the preselected reference pulse frequency by half in each of said cascaded plurality of flip-flop circuit frequency divider stages and for similarly modulationg the frequency of the combined number pulses and said reference frequency pulses in the same number of frequency divider stages; and means for comparing and measuring the difference in phase lag and lead between said frequency divided reference pulses and combined reference and number pulses, said difference being the algebraic sum of said positive and negative numbers.

References Cited in the file of this patent
UNITED STATES PATENTS

| | | |
|---|---|---|
| 2,939,081 | Dennis | May 31, 1960 |
| 3,011,110 | Yo-Chi Ho et al | Nov. 28, 1961 |